April 12, 1938.   F. L. O. WADSWORTH   2,113,956
METHOD AND APPARATUS FOR FEEDING MOLTEN GLASS
Filed March 27, 1935
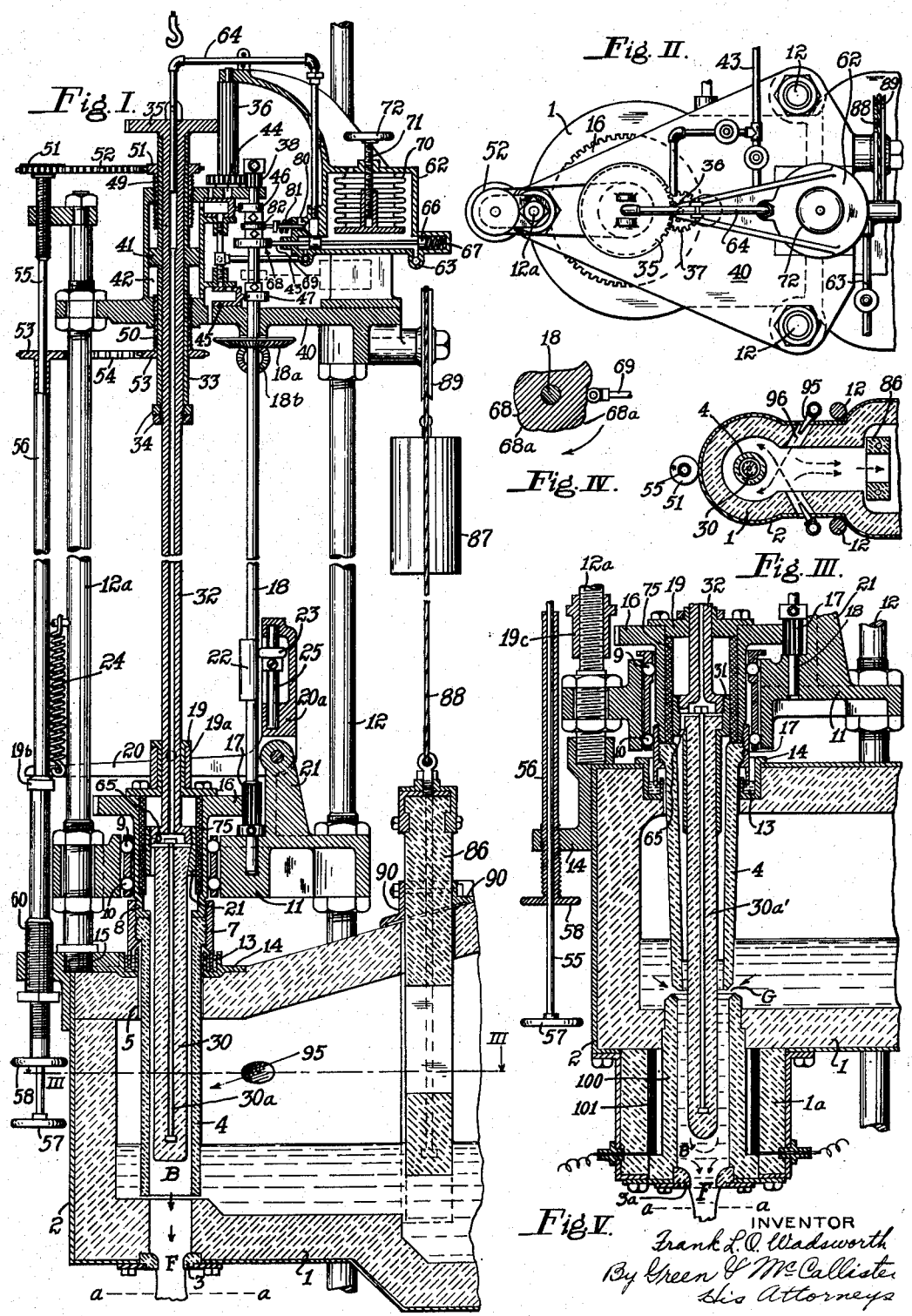
INVENTOR
Frank L. O. Wadsworth
By Green & McCallister
His Attorneys Patented Apr. 12, 1938

2,113,956

UNITED STATES PATENT OFFICE

2,113,956

METHOD AND APPARATUS FOR FEEDING MOLTEN GLASS

Frank L. O. Wadsworth, Pittsburgh, Pa., assignor to Ball Brothers Company, Muncie, Ind., a corporation of Indiana Application March 27, 1935, Serial No. 13,269

22 Claims. (Cl. 49—55)

This invention relates to a method and apparatus for feeding molten glass in a continuously flowing stream which presents a series of regularly recurrent enlarged sections connected together by portions of reduced area; and which is adapted to be severed at the points of reduced area into a series of successive mold charges of definite shape and weight.

One of the primary objects of my present invention is to subject a suitably segregated mass of molten glass to a constantly acting extrusion force for the purpose of producing a continuous discharge of the material from a submerged delivery orifice, and preventing any retraction of the outflowing stream, or any material arrest of, or interference with, this outflow during the normal intended operation of the feeder assembly.

Another object of this invention is to provide a feeder of the reciprocating plunger type which has various controls for adjusting the speed and range of movement of the plunger, while the machine is in operation—to vary and regulate the size and shape of the successively delivered charges—and which also has means associated therewith for assisting the action of the plunger in accelerating the discharge of glass through the delivery orifice on the down stroke thereof; for preventing any retraction or arrest of the outflow through the orifice at the beginning of the upstroke of the plunger; and for expediting and facilitating the accumulation of a fresh supply of molten glass over the delivery orifice during the continuation of this upward movement of the reciprocating member.

A further object is to provide novel means for agitating and continuously circulating the viscous body of glass, both in the forehearth or supply reservoir, and also in the accumulation or segregation chamber immediately above the delivery orifice, for the purpose of eliminating differences in temperature, or in physical character, in the extruded material; and to accomplish this result by subjecting the molten masses to the cooperative and concurrent action of coaxially arranged plunger and sleeve members which may be rotated concurrently or independently at either the same or at different speeds, and in either the same or in opposite directions.

Still another feature of the present improvements resides in the provision of means for controlling and limiting the inflow of glass from the supply reservoir to the segregation chamber during the period of accumulation therein, and for synchronizing this accumulation action with the upward or return movement of the reciprocable plunger member of the feeder mechanism in such manner as to eliminate any lifting or retractive effect on the glass in, or adjacent to the delivery orifice.

Other more specific objects of my invention will be made apparent to those skilled in this particular art by an examination and consideration of the two illustrative embodiments thereof which are described in the following specification and illustrated in the accompanying drawing; wherein:—

Figure I is a vertical sectional elevation on the central, longitudinal plane through the delivery orifice of a forehearth and feeder assembly;

Fig. II is a top plan view of the mechanism illustrated in Fig. I;

Fig. III is a horizontal section taken on the plane III—III of Fig. I;

Fig. IV is an enlarged sectional view of the "timer" cam which constitutes one of the control elements of my improved feeder organization; and Fig. V is a partial view in vertical section of another exemplification of my invention, the section being taken along a plane through the axis of the orifice.

The parent body of molten material, which is to be delivered by the feeder, is contained in a forehearth or supply chamber 1, which extends outwardly from the front of a suitable glass melting tank or furnace, and which is enclosed by a suitable metallic boot that is provided with a thick lining of refractory and heat insulating material. The glass in the forehearth flows from the chamber 1, through a passageway G, into a delivery chamber, B, whose lower end is partially closed by a removable flow ring or bushing 3, which defines the size and shape of the delivery orifice F. The passageway G is periodically varied in area by the up and down movement of a reciprocable sleeve 4, which is mounted above, and in axial alignment with, the orifice F, and which extends upwardly through an opening 5 in the roof of the forehearth 1. The upper enlarged end of this sleeve (4) is shown clamped against the adjacent extremity of a tubular sleeve 8 by means of a threaded coupling or collar 7; and this sleeve (8) is rotatably and reciprocably mounted—in upper and lower rows of balls 9 and 10—in a triangular cross head 11 which is carried by upright posts 12—12—12a, that extend upwardly from the forehearth boot.

The lower end of the collar 7 projects into an annular trough 13 that is filled with a suitable fusible metal, which melts at a relatively low temperature, and which then forms a liquid seal that permits a free rotary and reciprocatory movement of the connected members 4—7—8, while effectually preventing the gases in the forehearth from escaping through the roof opening around the sleeve 4. The trough 13 is formed in a metallic member 14 which is mounted on the roof of the forehearth 1 and which has a socket 15 therein for receiving the lower end of the post 12a and supporting it on the forehearth frame.

The sleeve 4 is continuously rotated, to agitate and circulate the molten glass in the front end of the forehearth chamber, by means of a gear 16, which is secured to the top of the cylinder 8 and is engaged by a pinion 17, which is secured to an upright and continuously revolving shaft 18, that, in turn, is driven from a suitable motor shaft gear connections 18a—18b.

The gear 16 is provided with a flanged hub sleeve 19 that carries a rotatable axially fixed collar (19a) which is pivotally supported between the forked arms 20 of a bell crank 20a, that is itself rockably mounted on the crosshead 11. The shaft 18 is provided with an elongated cam 22, which is engaged by a cam roller 23 carried by the bell crank 20a, and which serves to rock the bell crank in a clockwise direction and thus raise the sleeve 4. This upward movement of the sleeve 4 is aided by a coil spring 24 secured to the outer ends of the twin arms 20 and to the post 12a; and the reverse downward movement is effected by gravity, under the control of the rotating cam member 22.

In order to vary the lifting action of the cam actuated members 20—20a, and thereby vary the area of the passageway G when the sleeve 4 is fully raised, the roller 23 is slidably mounted on a vertical rod 25 which is carried by the bell crank 20a, so that by moving the roller 23 up and down on the rod the amount of rocking movement imparted to the bell crank by the cam may be readily controlled. When the passageway G has been fully opened, it has an area substantially greater than that of the orifice F; and as a result the molten glass can then flow into the accumulation or segregation chamber B, at a much more rapid rate than it can escape from the delivery opening at the bottom thereof.

When the desired quantity of glass has passed from the parent body in the forehearth to the interior of the tubular sleeve 4, the latter is permitted to move downward, by the continued rotation of the cam 22; and the passageway G is correspondingly throttled or restricted to trap or segregate the mass of material in the chamber B;—this downward movement of the continuously revolving tube (4) being controlled and limited by a vertically adjustable stop (19b) that is adapted to engage the outer end of the lever arms 20.

The continuous gravity outflow from the delivery orifice F is periodically augmented—to increase the rate of discharge and the resultant diameter of the outflowing stream—by the action of a reciprocating and rotating plunger 30, which is mounted within the sleeve 4; and whose movements are so timed that the initiation of its downward stroke is substantially coincident with the lowering of the sleeve 4 and the consequent restriction of the supply passage G. This plunger member 30 is reinforced by an embedded refractory metal bolt 30a, and is attached to the lower end of a tubular shaft 32 by means of a tapered sleeve coupling 21.

The shaft 32 is rotatably mounted in the flanged hub sleeve 19 of the gear 16, and is provided at its upper end with a loose bearing sleeve 33, which is held in place thereon between the hub of a gear 35 and the lock nuts 34. The connected shaft and plunger members 32 and 30 are continuously rotated from the shaft 18—at a speed which is preferably different (either in direction or in amount or both) from that of the sleeve 4—by means of the gear train 35—36 and 37—38, which is carried on a head frame 40 that is supported by the vertical posts 12, 12, 12a.

The sleeve 33 constitutes the piston rod of a double acting piston 41 which is slidably mounted in a vertical cylinder 42 carried by the head frame 40. The piston member 41 is periodically actuated—in order to move the plunger 30 toward and away from the delivery orifice F—by means of a suitable motive fluid that is admitted to the opposite ends of the cylinder 42 by the action of the piston valves 44, 45, which are actuated by the cams 46—47 on the shaft 18, and which serve to alternately connect the ends of the cylinder to the compressed air line 43 and to the atmosphere.

In order to regulate the length of the up and down strokes of the plunger 30, while the feeder is in operation, I have provided adjustable sleeve bolts, 49 and 50 which surround the piston rod sleeve 33 and which are threaded into the upper and lower heads of the cylinder 42. In order to facilitate the convenient manipulation of these stop elements, I connect them, by means of the sprocket wheels and chains 51—52 and 53—54, to vertical rods 55—56 which are rotatably mounted in suitable bearing blocks on the post 12a, and which are provided, at their lower ends, with hand wheels 57—58, by means of which the threaded sleeves 49 and 50 may be readily revolved and independently moved up and down with respect to the reciprocable piston 41.

To aid and accelerate the accumulation of glass in the chamber B, when the sleeve 4 is raised and the passageway G is opened, means are also provided for periodically connecting the annular space between the concentric plunger and sleeve members 4 and 30 to a suitable source of sub-atmospheric pressure. In the illustrative embodiment, this is accomplished by the use of a pressure control cell 62, which is alternately connected to a pipe 63 (Figs. I and II) that leads to a suitable source of relatively high vacuum (e. g., a continuously acting exhaust pump), and to the interior of the sleeve assembly 4—8—16, through the pipe 64, the tubular shaft 32 and a lateral port 65 at the lower end of this shaft and the adjacent portion of the coupling 21. The cell 62 is successively connected to the pipes 63 and 64 by means of a double acting piston valve 66 which is operatively held in engagement with a cam 68 on the shaft 18 by means of a coil spring 67. When this valve (66) is in the position shown (Fig. I) the vacuum conduit 63 is in communication with the cell 62, and the pressure therein is immediately reduced to that in the conduit; but when the valve is moved to the opposite end of its stroke, this communication is cut off and the space above the glass in the chamber B is opened to the previously evacuated space in the cell 62. The pressure in these connected spaces will then be quickly equalized, and the pressure on the surface of the glass within the sleeve 4 will be reduced by an amount corresponding to, and determined by, the ratio between the internal volume of the cell 62 and that of the sleeve and pipe connections 4—32—64, etc. This drop in pressure in the sleeve chamber will immediately accelerate the inflow of glass through the passageway G, and will cause the glass in the said chamber B to rise above the level of that in the surrounding forehearth.

In order to limit the degree of subatmospheric pressure established in the interior of the sleeve 4 (by the action last described) the internal volume of the pressure control cell 62 should be relatively small as compared with that of the sleeve itself; and in order to regulate and control this effect, the cell 62 is so constructed that its internal volume may be readily varied at will by the expansion and contraction of a sylphon bellows 70, one end of which is sealed to the top wall of the cell 62, and the other end of which is engaged by a combined right and left hand screw 71 that is threaded through this upper wall. It will be readily understood that when this screw is turned, the lower head of the bellows member will be moved either toward or away from the lower wall of the cell 62, and that the internal volume of the latter will be correspondingly changed. The pipe connection 64 is also provided with an internally opening poppet valve 80 which is normally held closed by a spring 81 and which is opened by a cam 82 on the shaft 18, to periodically establish communication between the interior of the sleeve 4 and the external air.

The operation of the mechanism thus far described is as follows:—When the parts are in the position shown in Fig. I, the sleeve 4 is at the lower end of its movement (as fixed by the setting of the stop 19b) the passageway G is substantially closed, and compressed air is being admitted to the top of the cylinder 42 for the purpose of moving the plunger assembly 30—32—33—41 downwardly to accelerate the flow of glass from the chamber B and through the delivery orifice F.

After the piston 41 has reached the lower end of its stroke (as determined by the setting of the sleeve bolt 50) the cam 46 permits the piston valve 44 to move to the right under the pressure on its closed head, thus shutting off further communication between the compressed air pipe 43 and the upper end of cylinder 42, and concurrently opening the latter to the atmosphere. The cam 22 then acts to lift the sleeve 4, and completely open the passageway G (by an amount determined by the setting of the cam roller 23) thus establishing free communication between the parent mass of glass in the forehearth chamber and the body of glass above the delivery orifice F, and permitting an unrestrained gravity flow therefrom. The cam 47 now comes into action to shut off communication between the external air and the lower end of the cylinder 42 and to gradually open the compressed air port leading thereto; and the plunger 30 begins to rise; but the cam 47 is so designed that this upward movement is at first so slow (as compared with the inflow of glass through the wide open passageway G), that the rising plunger exercises very little, if any, retarding effect on the outflowing stream of glass, and therefore substantially avoids any material arrest of flow or retraction at the orifice F. As the plunger continues to rise, the cam 68 permits the valve 66 to be moved to the left by the action of the spring 67; thereby closing the connection between the vacuum conduit 63 and the pressure control cell 62, and placing the previously evacuated interior of this cell in communication with the space above the glass in the segregation chamber B. As already stated, this immediately accelerates the inflow of glass to the interior of the sleeve 4, and raises the level therein to a predetermined height above that of the parent body (as controlled and determined by the adjusted volume of the cell 62).

As soon as the desired quota of glass has been accumulated above the delivery orifice, the cam 22 permits the bell crank lever 20—20a, and the sleeve members 4—19 etc. suspended therefrom, to move downwardly (a controlled gravity drop) to their lowermost position (Fig. I) and thus substantially close the inflow or supply passage G. Concurrently with this movement the cams 68, 82, 47 and 46 act in rapid succession, to first cut off communication between the pipe 64 and the cell 62 (and simultaneously place the latter in communication with the exhaust conduit 63), second, to momentarily open the pipe 64 to the atmosphere; and third to open the lower end of the cylinder 42 and connect the upper end thereof to the compressed air pipe 43, thus initiating another downward movement of the plunger 39 (to accelerate the discharge of glass from the delivery orifice F) and starting another cycle of operation.

In order to assist the action of the downwardly moving plunger in expelling glass through orifice F, and to further guard against any material retarding effect at the beginning of its upstroke, means are provided for effecting a slight compression of the air above the surface of the glass in the chamber B while the plunger is descending; and for then supplementing this effect, during the first stage of its succeeding upward movement, by introducing an additional quantity of compressed air from the pipe 43 at this time in the operation. For the purpose of compressing the air within the sleeve on the down stroke of the plunger, the collar 21, which couples the shaft 32 to the upper end of the plunger 30, is slidably engaged within a graphite bearing 75, that is carried by the gear sleeve 8; and as the distance between the bottom of the collar 21 and the surface of the glass within the sleeve 4 is decreased, there is a slight compression of the air in the inclosed space which aids in accelerating the outflow of glass from the orifice F. At the end of the down stroke, an additional quantity of compressed air may be admitted to the space above the glass in the sleeve chamber by so shaping and adjusting the cam 68 (see Fig. IV) that it will, at this time, move the valve 66 a short distance to the right of the position shown in Fig. I, thus momentarily connecting the lower end of the pipe 64 with the conduit 43.

The increased pressure on the glass surrounding the rising plunger tends to "strip" the glass from the upwardly moving member, and counteracts any residual lifting or retarding effect which it may have on the outflowing stream of molten material. The atmospheric relief valve 80 may, if desired, be momentarily opened to again establish atmospheric pressure in the sleeve chamber, before the latter is put into communication with the evacuated cell 62 (as above described); but this is not essential because the retention of a certain quantity of compressed air in the sleeve chamber merely reduces the subsequent drop in pressure therein when it is connected with the cell 62.

The cam 68 which controls the position of the valve 66 may also be provided with additional lobes 68a—68a (Fig. IV) which will act to momentarily establish communication between the compressed air conduit 43 and the pipe 64;—and thus admit successive "puffs" of high pressure fluid to the sleeve chamber—at different points in the down stroke of the plunger 30. When this is done, it will have the effect of progressively accelerating the expulsion of glass from the segregation chamber B and of correspondingly increasing the diameter of the outflowing stream. When the plunger 30 comes to rest at the bottom of its stroke, its explosive action on the glass in and above the delivery orifice F ceases, but the super-atmospheric pressure in the sleeve chamber (which may be produced either by the downward movement of the plunger 30, or by the admission of compressed air from the conduit 43, supra)—continues to act, in supplementing the effect of gravity, until it is relieved either by the opening of the valve 80 or by the establishment of the connection between the said chamber and the pressure control cell 62.

It will of course be apparent that at the time the plunger 30 comes to rest at the bottom of its stroke, the rate of continuous outflow from the delivery orifice F, will diminish, (because the sum of the extrusion forces acting on the glass in the chamber B, is then decreased), and that this will result in a natural "necking" (decrease in diameter) of the flowing stream at a point below the orifice. The cutting mechanism which is provided for severing the continuously flowing stream into successive mold charges is preferably so positioned—as indicated in dotted lines *a—a* in Fig. I and Fig. V—and so operated that it performs its intended function at the point, and at the time, when this "necking" is most pronounced. In this connection, it will be understood that the severance of the stream may be, and preferably is accomplished while the stream is unsupported, except by the lip of the orifice.

In order to close or shut off the flow of glass from the melting tank to the front end of the forehearth chamber 1, I provide a gate or baffle block 86, which extends through the roof of the forehearth, and which is suspended from a wire cable 88 that passes over a pulley 89, journaled in the head frame 40 and is connected to a counterbalance weight 87. Any escape of forehearth gases through the roof openings around the block is prevented by the angle members 90 which are clamped together against the faces of the member 86, and are provided with pads of refractory packing material that are pressed against the roof of the forehearth.

The molten glass in the forehearth 1 is maintained at the desired working temperatures by suitable fuel burners 95 which are positioned in openings 96 in the side walls, and are arranged at such an angle that the streams of burning gases are projected forwardly, and pass, one above the other, around the sleeve 4; and are then directed backwardly—through an opening in the block 86—into the rear end of the forehearth, and thence into the main tank or furnace chamber. This arrangement eliminates the need of any special chimney flues for the forehearth chamber itself.

In Fig. 5, I have shown another exemplification of my invention, in which the delivery orifice F is located in the floor of a detachable subforehearth 1a, which extends a considerable distance below the bottom of the main forehearth 1, and which may be independently heated by means of an electric induction or resistance element 101 that is connected to any suitable source of current.

In this construction, a column of glass of any desired height may be maintained above the orifice F (by using sub-forehearths of varying depth), and the natural gravity flow therefrom may therefore be materially increased, as compared with that obtained in the use of the first described construction. This tends to diminish the amount of "natural necking" at the end of the down stroke of the plunger 30a' because it increases the ratio between the gravity forces and the externally applied expulsion forces (plunger movement and air pressure) acting on the glass in the segregation chamber B. With the exceptions above noted, the construction and mode of operation of the organization illustrated in Fig. V are substantially the same as of that shown in Figs. I to IV inclusive, it being understood that the internal diameter of the sleeve 100 exceeds the external diameter of the plunger 30a' such an amount that the upward movements of the plunger will not appreciably reduce the downward flow of molten glass from the main forehearth and into the segregation chamber B' when the sleeve 4 is raised, and also is such as to permit an inflow around the plunger and to the chamber B' such that the slow lifting of the plunger will not occasion a retraction at the orifice F.

From the foregoing description of my invention, it is readily apparent that I have provided an apparatus for feeding molten glass in which a stream of such material is continuously flowing from a delivery orifice under the action of gravity, and that this gravity flow is periodically accelerated by the complementary action of the reciprocating plunger and guard sleeve;—thereby producing a series of regularly recurrent stream sections of enlarged diameter which are connected together by sections of reduced diameter, and which are severed one from the other by cutting through the portion of the stream of less diameter while the stream is suspended from the orifice. It is also apparent that the upstroke of the reciprocating plunger can have no material effect on the gravity discharge from the delivery orifice; first, because the passageway G is at that time fully opened and glass can flow into the plunger chamber more rapidly than it can escape from the orifice F; second, because the beginning of this upstroke is relatively slow; and third, because I can, if I desire, compensate for any negative lifting action of the rising plunger by applying a supplemental air pressure to the glass in the sleeve, at the end of the down, and at the beginning of the upstroke, of the reciprocating member. The sections of reduced diameter in the outflowing stream are merely the result of a periodic decrease in the sum total of the extrusion forces (gravity, plunger movement, and air pressure) and are not produced by any arrest or stoppage, or retraction (reversal) of the flow.

In the respects above noted, the operation of my improved feeder is characteristically different from that of the usual forms of forced flow feeders (either plunger feeders or air feeders) in which the desired and intended action is to obtain periodic reversals of the resultant of the forces acting on the glass adjacent to the delivery orifice, and thus obtain not only a periodic arrest, but also a concurrent retraction, or reversal of the outflow therefrom. The herein described apparatus may be descriptively designated as an accelerated gravity (natural) flow feeder as distinguished from what is generally referred to as a "suspended gob feeder".

It is further apparent, from the foregoing description, that both the size and the shape of the successively formed stream sections may be varied and controlled, within wide limits, while the feeder is in continuous operation; first, by varying the upstroke and/or downstroke of the plunger (by means of the manually adjustable elements 49—50); second, by controlling the maximum and minimum areas of the passageway G (by adjustment of the parts 19b and 23); third, by changing the internal volume of the pressure control cell 62 (by turning the screw 71); fourth, by changing the speed of the motor driven shaft 18 (by suitable rheostat controls or otherwise); fifth by regulating the pressure in either or both the conduits 43 and 63 (e. g. by the valve controls shown in Fig. II); and sixth, to some extent by variations in the temperature of the outflowing glass (by adjustment of the burners 95 or of the current flow to the electric heating element 101 of Fig. V); and that further changes in the relative magnitude of the forces acting on the outflowing stream of glass—(which will affect the weight and/or the form of the successively delivered mold charge sections)—may be readily secured, by using actuating cams (22, 46, 47, and 68) of varied contour; or flow bushings (3—3a) having different sizes of delivery orifice; or sub-forehearths (100) of greater or less depth.

Those skilled in this art, will understand that in the practice of my present invention, it is not necessary, in all cases, to use a superatmospheric pressure in assisting the action of the reciprocating plunger member on the glass in the segregation chamber B; or to utilize a sub-atmospheric (partial vacuum) pressure in accelerating the inflow of glass to that chamber during the accumulation period. In such cases the sleeve bearing or packing for the plunger head coupling 21 may be removed, and the pressure control cell 62—with its associated parts—may be either omitted, or may be rendered inoperative (e. g. by moving the cam 68 out of operative relationship to the valve 66) without altering the structural relationship or the functional characteristics of the remaining parts of the feeder mechanism. With the preceding disclosure as a guide, engineers and others who are familiar with various forms of glass feeding apparatus will also be enabled to design and construct many different forms of apparatus, which will embody, in whole or in part, the characteristic features and advantages of my herein described improvements.

Having thus described my invention, what I claim as new and desire to secure by Letters Patent is:—

1. The combination comprising a forehearth for molten glass having a submerged delivery orifice therein, a reciprocable sleeve extending into said forehearth in alignment with said orifice, means for reciprocating said sleeve to alternately increase and restrict communication between the delivery orifice and the forehearth, a member reciprocably mounted in said sleeve for expelling the glass in said sleeve through the orifice, means for independently reciprocating said member in timed relation to the reciprocation of said sleeve whereby the upward movement of said member is initiated after said sleeve has been moved to increase such communication, and means for establishing superatmospheric pressure in said sleeve to prevent retraction of the stream on the upstroke of the sleeve and member.

2. In combination with a forehearth having a submerged orifice therein, of a sleeve mounted above said orifice and in axial alignment therewith, a plunger reciprocably mounted within said sleeve, means for reciprocating said sleeve, means for reciprocating said plunger, and means carried by said plunger for compressing the air within said sleeve on the downward movement of said plunger.

3. A feeder for molten glass comprising in combination a forehearth for molten glass having a submerged delivery orifice, a sleeve mounted in said forehearth and in axial alignment with said orifice, means for reciprocating said sleeve to alternately enlarge and restrict a passageway between said orifice and the interior of the forehearth, means for raising the glass to a predetermined level within said sleeve when said passageway is open, mechanical means for expelling the glass from said sleeve when said passageway is restricted and means associated with said mechanical means for compressing the air within said sleeve during the operation of said mechanical means.

4. A feeder comprising in combination, a forehearth for molten glass having a submerged delivery orifice, a sleeve extending into said forehearth in axial alignment with the orifice, means for reciprocating said sleeve, a vacuum chamber, means for connecting the interior of said sleeve to the vacuum chamber when the sleeve is elevated, means for varying the volume of said vacuum chamber, means for expelling the molten glass from the interior of said sleeve through the orifice when the sleeve is depressed, and means for compressing the air within said sleeve during the expulsion period.

5. A feeder comprising in combination, a forehearth for molten glass having a submerged delivery orifice, a sleeve extending into said forehearth in axial alignment with the orifice, means for reciprocating said sleeve, a vacuum chamber, means for connecting the interior of said sleeve to the vacuum chamber when the sleeve is adjacent the upper end of its stroke, means for varying the volume of said vacuum chamber, a plunger mounted within said sleeve, means for reciprocating said plunger, and means for building up a supplemental pressure within said sleeve on the downstroke of said plunger.

6. A feeder comprising in combination, a forehearth for molten glass having a submerged delivery orifice, a sleeve extending into said forehearth in axial alignment with said orifice, means for reciprocating said sleeve to alternately enlarge and restrict a passageway between the forehearth and the orifice, a plunger mounted within said sleeve, means for reciprocating said plunger, means for independently varying the up and down stroke of said plunger, and means associated with said plunger for compressing the air within said sleeve to build up an additional expelling force in said sleeve on the downstroke of said plunger.

7. A feeder comprising in combination, a forehearth for molten glass having a submerged delivery orifice, a sleeve extending into said forehearth in axial alignment with said orifice, means for reciprocating said sleeve to alternately enlarge and restrict a passageway between the forehearth and the orifice, a plunger mounted within said sleeve, means for reciprocating said plunger, means for independently varying the up and down stroke of said plunger, means associated with said plunger for building up an auxiliary expelling force in said sleeve on the downstroke of said plunger, and means for connecting said sleeve to a source of pressure on the downstroke of the plunger.

8. The method of feeding glass, which consists in maintaining a continuous discharge of molten glass through a molten glass submerged orifice, periodically accelerating such discharge by subjecting the glass approaching the orifice to the action of a downwardly moving sticky plunger, subjecting the glass above the orifice to fluid pressure as such plunger is retracted, while continuing the gravity flow and severing the stream of glass issuing from the orifice at a point below and adjacent thereto.

9. A method of feeding molten glass which consists in creating a gravity flow from a body of glass through a glass submerged orifice, diverting a portion of the flow from said body to said orifice and accumulating therefrom a mass of glass at a level above the level of said body, substantially cutting off communication between said body and said orifice and segregating said mass from said body while maintaining the mass in open communication with the orifice, subjecting the segregated mass to the expelling force of a downwardly moving implement to augment the flow through said orifice, applying a secondary expelling force to such mass while re-establishing full communication between said body and said orifice to counteract any arresting of flow through the orifice, discontinuing the secondary expelling force and severing the stream of glass issuing from the orifice at a point below but adjacent to the orifice.

10. A method of feeding glass in the form of a succession of measured mold charges, which consists in establishing a gravity flow of molten glass from a body of the same and through a glass submerged orifice, augmenting the flow through said orifice by subjecting the glass moving toward the orifice to the action of a downwardly moving sticky plunger, raising said plunger while subjecting the glass moving toward the orifice to an increase in fluid pressure applied to the surface of such glass, discontinuing such fluid pressure and severing the stream of glass issuing from the orifice during the period of unaugmented gravity flow from said body through said orifice, and repeating the cycle to form a succession of measured mold charges.

11. A method of feeding molten glass, which consists in establishing a free gravity flow from a body of molten glass through a glass submerged orifice, diverting a portion of such flow and accumulating a mass of molten glass above said orifice at a level above the level of said body, substantially closing off communication between said orifice and said body to segregate the mass accumulated above said orifice from said body, applying the expelling force of a downwardly moving implement to said mass to increase the flow through said orifice, subjecting the mass to fluid pressure while reestablishing full communication between said orifice and said body and while moving said implement upwardly away from said orifice to maintain a continuous flow through said orifice, discontinuing such expelling force as full communication is re-established between said body and said orifice and then severing the stream of glass issuing from the orifice at a point below but adjacent to the orifice.

12. A method of feeding molten glass in the form of a succession of measured mold charges, which consists in establishing a free gravity flow through a glass submerged orifice from a body of glass located above the orifice, diverting a portion of the flow moving toward said orifice to accumulate a mass of glass above the orifice at a level above that of said body, subjecting the accumulated mass to successively applied external forces while restricting the flow from said body to said orifice, removing the restriction to flow from said body toward and through said orifice while gradually decreasing the external forces applied to the glass over the orifice to prevent any arrest in flow therethrough, and severing the stream of glass issuing from the orifice before the application of any such externally applied force and then repeating the cycle to form a succession of measured mold charges.

13. A method of feeding molten glass in the form of a succession of measured mold charges, which consists in establishing a gravity flow of molten glass through a glass submerged orifice and from a body of molten glass located above said orifice, diverting a portion of the flow toward said orifice and accumulating a quota of glass above said orifice having a level above that of said body, reducing the flow from the body to the orifice, simultaneously applying the expelling force of a downwardly moving implement to said quota to accelerate the flow through said orifice, then gradually increasing the flow from the body to said orifice and returning said implement to its initial position while applying a progressively decreasing force to the glass above said orifice, and severing the stream of glass issuing from the orifice, at a point below the orifice.

14. A feeder for molten glass comprising, a forehearth having a submerged delivery orifice formed therein, a sleeve reciprocably mounted over said orifice, means for reciprocating said sleeve to enlarge and restrict communication between the forehearth and said orifice, means for subjecting the interior of said sleeve to sub-atmospheric pressure when said sleeve is in its uppermost position, a reciprocal plunger located within and extending longitudinally of said sleeve, means operable after said sleeve is lifted, for raising said plunger, and means for counteracting the retractive forces set up as said plunger is raised.

15. A feeder for molten glass comprising, a forehearth having a submerged delivery orifice formed therein, an inverted bell extending downwardly into the glass within said forehearth and located above said orifice, a control chamber, means for alternately connecting said control chamber to a source of sub-atmospheric pressure to the interior of said bell to first exhaust said chamber and then to equalize the pressure between said bell and said chamber when said bell is in a raised position, and means for subjecting the molten glass within said bell to an expelling force when said bell is in a lowered position.

16. A feeder for molten glass comprising, a forehearth provided in a delivery orifice in the bottom thereof, a reciprocably mounted sleeve extending downwardly into the glass within said forehearth and located above said orifice, a reciprocably mounted plunger located within and extending longitudinally of said sleeve, a control chamber, means for periodically exhausting said chamber to establish a definite fluid pressure within said chamber, means for reciprocating said sleeve, independent means for reciprocating said plunger and means operative in timed relation with the reciprocation of said sleeve for establishing communication between said exhausted chamber and the interior of said sleeve.

17. A method of feeding molten glass which consists in establishing a gravity flow from a supply body of molten glass through an orifice submerged thereby, periodically augmenting the flow through the orifice by subjecting the glass thereover to the action of a downwardly moving implement, and subjecting the glass over the orifice to fluid pressure while initiating the movement of said implement away from said orifice to counteract the residual lifting force on the glass by said implement.

18. A method of feeding molten glass which consists in establishing a gravity flow from a supply body of molten glass through an orifice submerged thereby, augmenting the flow through the orifice by periodically subjecting the glass thereover to the action of a downwardly moving implement, moving said implement away from said orifice and counteracting the residual lifting force on the glass by such movement of the implement away from the orifice.

19. A method of feeding molten glass which consists in creating a gravity flow from a supply body of molten glass and through an orifice submerged thereby, periodically increasing the flow through the orifice by subjecting the glass thereover to the action of a downwardly moving implement while simultaneously subjecting the glass to the extrusive action of fluid pressure, moving said implement away from said orifice and continuing the application of such fluid pressure while such movement of the implement is initiated.

20. A method of feeding molten glass which consists in establishing a flow of molten glass from a supply body to and through an orifice submerged by such body, periodically accelerating the flow through such orifice by diverting a portion of such flow and utilizing the diverted portion to increase the head above the orifice, further increasing such flow by applying an external expelling force to the glass above the orifice while restricting communication between the orifice and the supply body, removing the restriction between said supply body and said orifice while applying a second external expelling force to the glass over the orifice to maintain a continuous flow therethrough and severing the stream issuing from the orifice while the same is suspended therefrom.

21. The method of feeding molten glass which consists in establishing a flow from a body of molten glass through an orifice submerged by such body and in the form of a suspended stream, diverting a portion of such flow and accumulating a mass of glass from such diverted portion above said orifice to increase the gravity head thereof over that of such body, trapping the accumulated mass of glass above the orifice by restricting the flow from such body to said orifice, subjecting the trapped mass of glass to an external force to augment the flow through the orifice, and continuing the application of such force while removing the restriction between such body and said orifice and thereby maintain the flow through said orifice until said restriction is fully removed and severing the stream issuing from said orifice.

22. A method of feeding molten glass which consists in establishing a flow of molten glass through an orifice submerged by a body of such glass, accumulating glass from such body at a point above but in communication with said orifice to a level higher than that of such body, augmenting the flow through such orifice by subjecting the accumulated glass to the combined action of a downwardly moving plunger and a preadjusted fluid pressure while preventing a flow from such accumulated glass to said body, subjecting the glass passing through such orifice to the expelling action of fluid pressure as such plunger comes to rest and begins to rise and severing the stream issuing from the orifice at a point below but adjacent to the orifice.

FRANK L. O. WADSWORTH.